United States Patent [19]
Bååth

[11] Patent Number: 5,629,706
[45] Date of Patent: May 13, 1997

[54] METHOD FOR SIMULTANEOUSLY MEASURING THE POSITIONS OF MORE THAN ONE SURFACE IN METALLURGIC PROCESSES

[76] Inventor: Lars Bååth, Blindskärsvägen 11, S-439 92 Onsala, Sweden

[21] Appl. No.: 510,216

[22] Filed: Aug. 2, 1995

Related U.S. Application Data

[63] Continuation-in-part of PCT/SE94/00099 Feb. 13, 1994, published as WO/94/18549 Aug. 18, 1994.

[30] Foreign Application Priority Data

Feb. 3, 1993 [SE] Sweden ................... 9300348

[51] Int. Cl.$^6$ ................ G01S 13/88; G01N 22/00; G01F 23/284
[52] U.S. Cl. ................................ 342/124; 342/127
[58] Field of Search ................... 342/124, 127; 367/908; 73/290 R, 290 B

[56] References Cited

U.S. PATENT DOCUMENTS

| | | | |
|---|---|---|---|
| 4,044,353 | 8/1977 | Levy | 342/124 |
| 4,210,023 | 7/1980 | Sakamoto et al. | 73/290 R |
| 4,458,530 | 7/1984 | Bastida | 73/290 R |
| 4,665,403 | 5/1987 | Edvardsson | 342/124 |
| 4,737,791 | 4/1988 | Jean et al. | 342/124 |
| 4,818,930 | 4/1989 | Flemming et al. | 342/631 |
| 5,115,242 | 5/1992 | Nagamune et al. | 342/124 |

FOREIGN PATENT DOCUMENTS

| | | |
|---|---|---|
| 0060597 | 9/1982 | European Pat. Off. . |
| 2812871 | 10/1978 | Germany . |
| 58-172616 | 4/1985 | Japan . |
| 9110899 | 7/1991 | WIPO . |

*Primary Examiner*—Ian J. Lobo
*Attorney, Agent, or Firm*—Nils H. Ljungman and Associates

[57] ABSTRACT

A method for measuring the position of at least one surface in a metallurgical process which includes the steps of providing a metallurgical melt, the metallurgical melt including at least a metal portion and a slag layer, providing a signal generator for generating signals at a plurality of frequencies over a frequency band, and providing an antenna for receiving the signals generated by the signal generator and for transmitting circularly polarized radio waves at the plurality of frequencies over the frequency band. The invention further includes the steps of disposing the antenna adjacent the metallurgical melt, transmitting the circularly polarized radio waves from the antenna toward the metallurgical melt, the circularly polarized radio waves being transmitted by the antenna at the plurality of frequencies over the frequency band, receiving reflected images of the transmitted radio waves through the antenna, the received reflected images of the transmitted radio waves having a substantially opposite circular polarization from the transmitted circularly polarized radio waves, determining a phase displacement between the transmitted radio waves and the received reflected images of the transmitted radio waves, transforming the determined phase displacement from a frequency to a time plane, and determining from the time plane transform a position of at least one surface of at least one of the metal portion and the slag layer.

20 Claims, 4 Drawing Sheets

Flow diagram program SLAGG

METHOD FOR SIMULTANEOUSLY MEASURING THE POSITIONS OF MORE THAN ONE SURFACE IN METALLURGIC PROCESSES

CONTINUING APPLICATION DATA

This application is a Continuation-In-Part application of International Application No. PCT/SE94/00099, filed on Feb. 3, 1994, which claims priority from Swedish Patent Application No. 9300348-1, filed on Feb. 3, 1993. International Application No. PCT/SE94/00099 was pending as of the filing date of the present U.S. application and the U.S. was an elected state in the International Application No. PCT/SE94/00099.

BACKGROUND OF THE INVENTION

Field of the Invention

This invention relates to a method in metallurgical processes for simultaneously measuring the positions of more than one surface.

BACKGROUND INFORMATION

In converters, ladles, electric arc furnaces and other metallurgical vessels, it is desirable to know the exact position of the slag surface and the position of the interface between the slag amd the liquid metal. Although many methods have been used in the prior art, no method has been at the same time fast, reliable and accurate. It may also be desirable to be able to measure the positions of other surfaces for example in order to control the thickness of the lining of vessels.

Changes in the pattern of electromagnetic wave fronts represent the most sensitive probes in physics. Electromagnetic waves may penetrate media of varying physical properties, changing its amplitude and phase in a way which is specific to the content of the media. Thus, continuum radiation will be affected when penetrating a media in the sense that the amplitude will be attenuated and the propagation velocity will change, resulting in a sudden change of phase in the interface surface. The radioband is of particular interest in that here waves can penetrate deeper into dusty areas and penetrate through ceramic material.

It is known that the interference between a transmitted wave and a reflected wave will create a standing wave pattern at a specific frequency determined by the positions of the null in this standing wave pattern and that this so determined wavelength of the signal will tell the position of a single surface, EP-A-60 597. Only the position of a single surface can be determined with this technique, which severely limits the usefulness of the method in metallurgic process industry. Furthermore, the amplitude of the standing wave is measured rather than its phase which severely limits the resolution and the testability of the method.

It is also known that a distance can be measured if the transmitted signal is swept in frequency and the reflected and transmitted signal are mixed so that a low frequency (IF-)signal is created, DE-2812 871. The frequency of this IF-signal is dependent on the time-delay of the reflected signal as compared to the sweeping time of the transmitter. This particular method can detect only a single surface.

It is also known that the angle of polarisation of a transmitted signal will change when it is reflected at a large angle at two surfaces, WO 91/10899 and U.S. Pat. No. 4,818,930. These methods are both transmitting at a single frequency at a large angle (larger than the Brewster angle) to the surface and can detect only the thickness of the layer between the two surfaces and only modulus the transmitted wavelength.

None of the above patent publications illustrates or discusses the phase change across the frequency bandpass and none of the above methods can therefore detect the positions of several surfaces simultaneously with an antenna system mounted at right angle to the surfaces. None of the above patents illustrates nor discusses the extension to three dimensional imaging of several surfaces. The method presented here is therefore significantly different from the above mentioned prior art.

OBJECT OF THE INVENTION

It is an object of the invention to provide a method of this kind which is fast, reliable and accurate.

SUMMARY OF THE INVENTION

The time-delay of a signal relative another signal is in the Fourier-, or frequency space a linear shift of phase with frequency. If the object signal is transmitted towards and reflected in a surface, then the relative phase of the signals therefore will change linearly with frequency. If the signal is measured in steps over a frequency band, then a plot of phase with frequency would be a line with a slope corresponding to the delay of the reflecting signal compared to the reference signal. The distance car/thus be measured via such a frequency stepped system. If the signal is instead transmitted towards a semitransparent medium, then pan of the signal will be reflected, and part of the signal will propagate through the medium to be reflected in the next surface where the index of refraction again is changing. These doubly reflected waves will, when complex multiplied with the conjugate of the reference signal, show a more complicated curve of phase as a function of frequency. If data therefore are sampled as complex amplitudes in frequency channels over a frequency band, then the distances to both surfaces can be recovered. If then the signal is transmitted and received by an interferometer in the aperture plane, then the full three-dimensional structure of the two surfaces can be reconstructed. This is also true for a mixture where more than two surfaces are present.

BRIEF DESCRIPTION OF THE DRAWING

The invention will be more closely described with reference to the drawings.

DESCRIPTION OF THE PREFERRED EMBODIMENT

Figure 1:
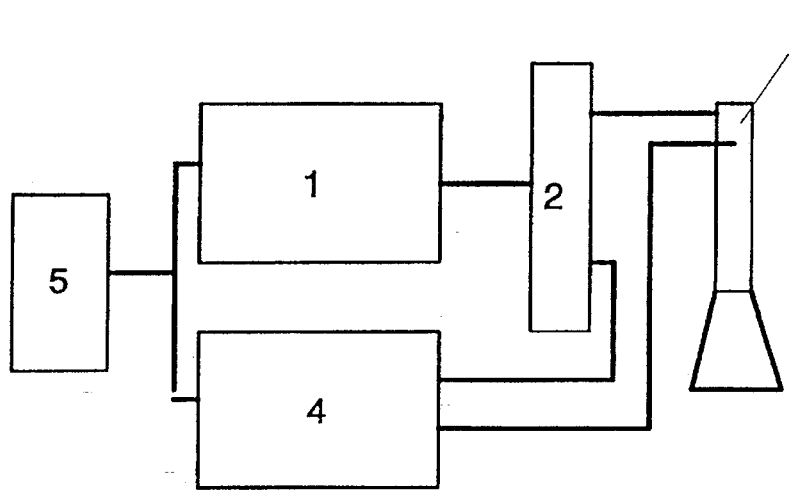
FIG. 1 shows a schematic representation of a system in accordance with the invention for measuring the positions of multiple surfaces.
Figure 2:
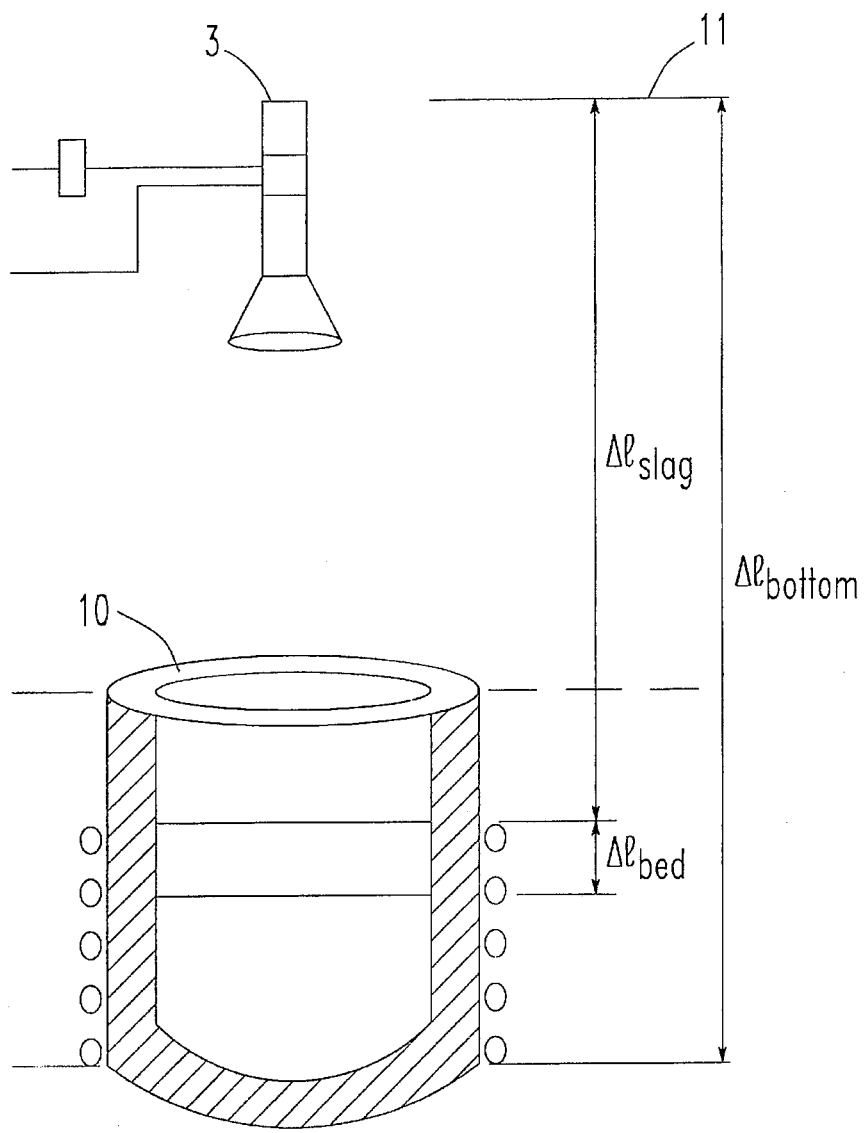
FIG. 2 shows schematically a metallurgical vessel to which the invention can be applied.

An example of the invention is shown in FIGS. 1 and 2. A signal is created at a defined frequency with a signal generator 1. This signal is transferred via a cable to a powersplitter 2 where one path is conveyed via a cable to an antenna 3. The second path is conveyed via a cable to a phase comparator unit 4 where it is used as reference signal. The antenna transmits the radio signal as a circular polarisation towards the metal metallurgical vessel in the form of a ladle 10 shown in FIG. 2. The signal is aimed at perpendicular angle to the surface of the metal bath in the vessel 10 and reflected at the surfaces of the slag and metal bath as shown in FIG. 2 and received by the same antenna 3 in the opposite circular polarisation due to the odd number of reflections. The received signal is transmitted through a cable to the phase comparator 4 and there complex multiplied with the conjugate of time reference signal. The amplitude and phase of the complex conjugate multiplication is stored in a table by a computer 5 and the signal generator is stepped in frequency and a new measurement is taken. This procedure continues until a fixed number of frequency channels have been measured separately over a frequency band. The equipment is controlled by a computer which also stores the data and does the signal analysis.

The reference wave received at time $t_o$ and at frequency w may be written as:

$$U_{ref}(w)=e^{jwt_o}$$

The signal reflected from the first surface and referred to the same receiving time $t_o$ can be written as:

$$U_{S1}(w)=e^{j(w(t_o-2D1_{slag}/c))}$$

The signal reflected from the second surface and referred to the same receiving time $t_o$ can be written as:

$$U_{S2}(w)=e^{j(w(t_o-2D1_{slag}/c-2D1_{bad}*n_{slag}/c))}$$

$D1_{slag}$ and $D1_{bad}$ are represented in FIG. 2.

$D1_{slag}$ is the distance to the first (slag) surface, from a reference position in the antenna represented as a level 11. $D1_{bad}$ is the distance between the two surfaces (slag and metal bath), c is the velocity of light in air, and $n_{slag}$ is the refractive index of the medium between the two surfaces. The complex conjugate multiplication, or cross correlation in the time domain, of the reflected and reference signals is then: (U* is the conjugate of U)

$$S_{corr}(w)=U*_{ref}(w) \cdot U_{S1}(w)+U*_{ref}(w) \cdot U_{S2}(w)$$

or, if the frequency is restricted to a pass band $Bpass(w_1,w_h)$:

$$S_{corr}(w)=Bpass(w_1,w_h)e^{j(-w2D1_{slag}/c)}+$$
$$Bpass(w_1,w_h)e^{j(-w(2D1_{slag}/c+2D1_{bad}*n_{slag}/c))}$$

The inverse Fourier-transform will transform from the frequency to the time-plane (delay or distance-plane). Bpass $(w_1,w_h)$ can be approximated with $Rect(w_1,w_h)$:

$$F^{-1}S_{corr}(Dt)=\text{sinc}(Dt-2D1_{slag}/c)+\text{sinc}(Dt-2D1_{slag}/c-2D1_{bad}*n_{slag}/c)$$

The time-delay response of the system is usually called the Point Spread Function in optics, and is in this case the Fourier transform of the frequency pass band. This response is measured by studying the response of a metal reflector at a known distance. The distances to the surfaces are then reconstructed from the observed signal by deconvolving with the measured Point Spread Function. The distance can then be referred to a specified reference level, $D1_{ref}$, through a translation of the time co-ordinate: $Dt=Dt-2D1_{ref}/c$. The reference level may be a previously measured metal reflector in the signal path, or the edge of the metal container. The transform contains the structure in the depth-direction. If the data are also sampled in the aperture plane by using an interferometer as transmitter and receiver antennas then a further two dimensional transform over the aperture-plane will show the structure over the remaining two dimensions. In the case of an interferometer as antenna the measurement will also have an aperture plane term for each measured point (u,v) in this plane:

$$F^{-1}S_{corr}(Dt)=(\text{sinc}(Dt-2D1_{slag}/c)+\text{sinc}(Dt-2D1_{slag}/c-2D1_{bad}*n_{slag}/c))e^{j2P(Q_x u+Q_y v)}$$

Here $Q_x$, $Q_y$ is the position in the image plane. u,v is the position in the Fourier, aperture, plane of the interferometer elements, which in this case consists of individual radio hornantennas the signals of which are cross correlated against each other as well as complexly multiplied with the conjugate of the reference signal. The transmitting interferometer will create a plane wave front parallel to the surfaces. The receiving interferometer will detect the changes of phase over the wavefront and thus measure positions of the surfaces as above, but in three dimensions over an area of the surfaces.

Figure 4:
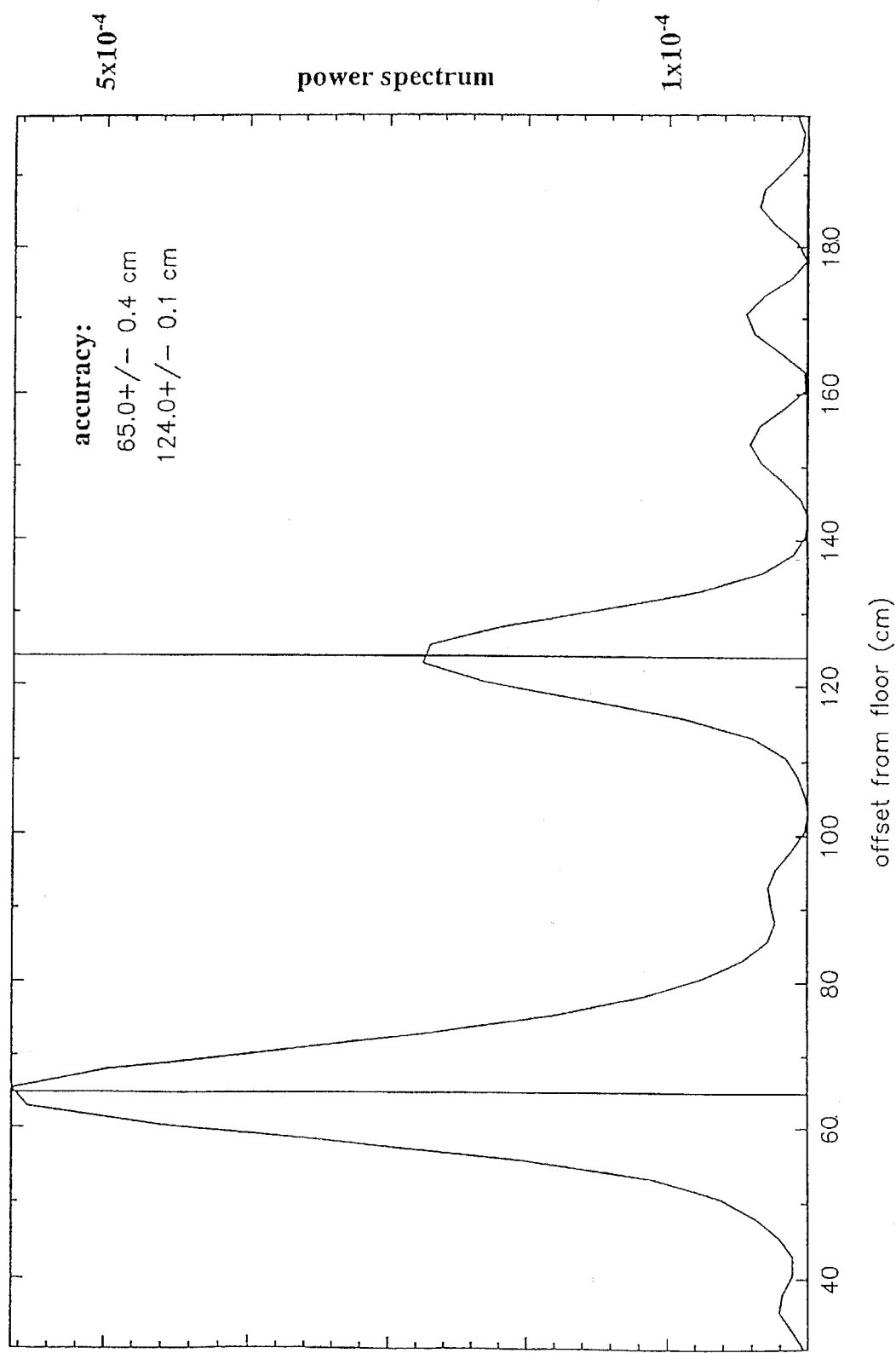
FIG. 4 is a diagram of the reflections from the slag surface and metal bath surface obtained from the same experiment.

The above described technique and apparatus was used in a test experiment where a metal bath was iron. On top of the metal bath was a melted slag of known composition from a metallurgic plant. FIG. 4 shows detections of the slag surface as well as the metal bath surface. The levels refer to an arbitrarily chosen reference level (the floor). In this way, the thickness of the slag can be found in secondary metallurgy (ladle metallurgy) with great accuracy (1–2 mm).

Figure 3:
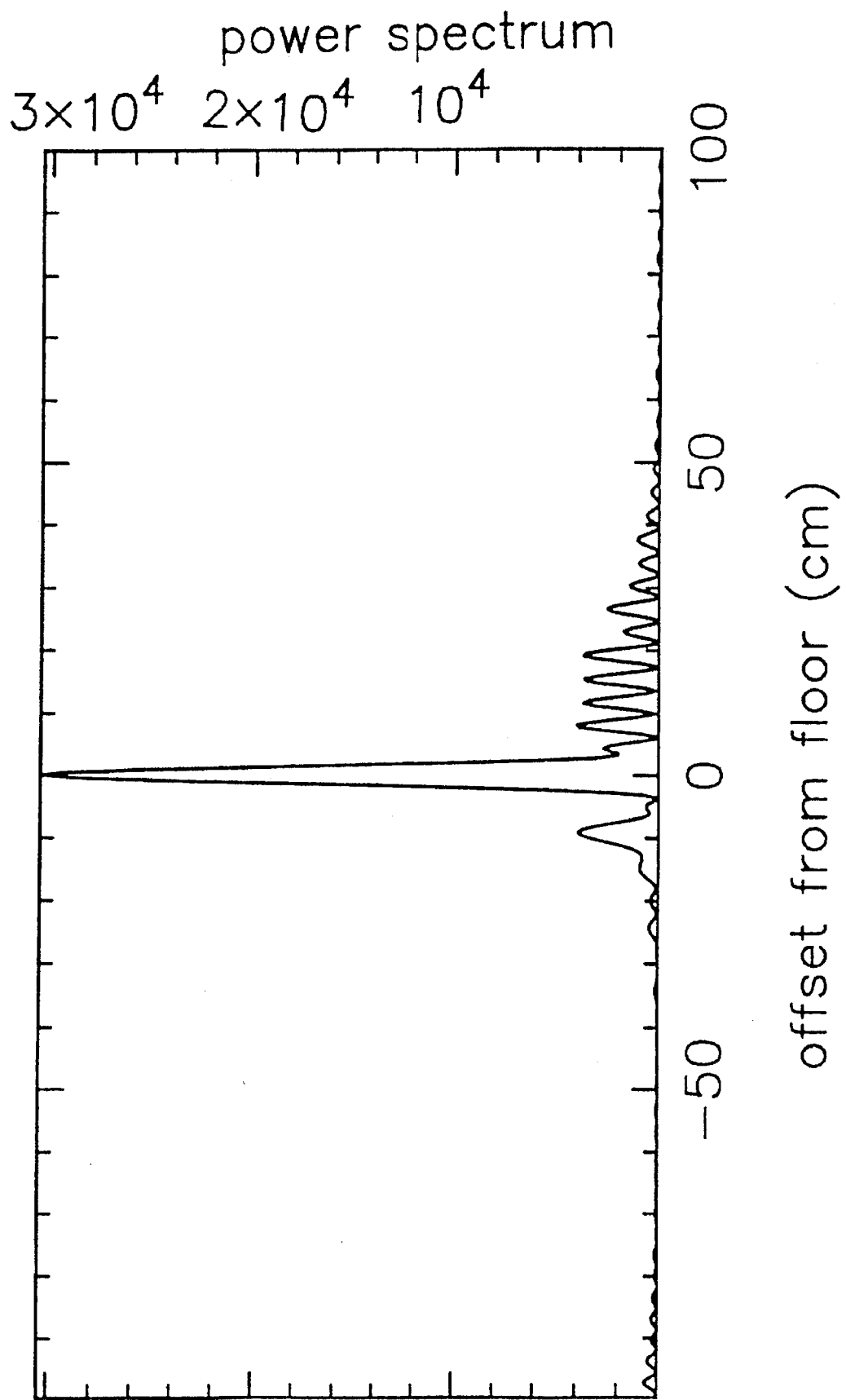
FIG. 3 is a diagram showing a point-spread-function (PSF) of the frequency pass band obtained from an experiment described with reference to FIGS. 1 and 2.

FIG. 3 shows the point spread function (PSF) of the frequency band for the best experiment.

An actual working example of the invention has been implemented. Referring to FIG. 1, the following components have been utilized:

| An actual working example of the invention has been implemented. Referring to FIG. 1, the following components have been utilized: | |
|---|---|
| 3 feed horn | Philips circular horn for FEBO antenna |
| polarisation filter ortho coupler | Swedish Microwave SMW D-12 Swedish Microwave SMW OMT 11A |
| converter waveguide to coaxial cable | Quasar Technology for 10–15 GHz band |
| 2 power divider | Wiltron K240C |
| 1 signal generator | Wiltron System Signal Source type 360SS69 |
| 4 receiver | Wiltron Active Device Test Set type 3621A |
| 5 data acquisition | Wiltron Vector Network Analyser type 360B |
| Addresses for these companies are as follows: | |

Quasar Microwave Technology Ltd
Battle Road, Heathfield, Newton Abbot
Devon TQ12 6XU
United Kingdom An actual working example of the invention has been implemented. Referring to FIG. 1, the following components have been utilized:

Wiltron Company
490 Jarvis Drive
Morgan Hill, CA 95037-2809
USA

Swedish Microwave AB
P.O. Box 230
S-591 23 Motala
SWEDEN

As concerns the inter-unit connections, the two output signals from the power divider 2 are connected to one port of the antenna 3 transmitting a signal of left hand circular polarisation with a heliax cable (Andrew FSJ4-50B) and the receiver 4 with a steel coaxial cable. The other radio frequency port of the receiver 4 is connected to the other port of the antenna 3 via a heliax coaxial cable (Andrew FSJ4-50B), receiving the signal in the opposite, right hand circular polarisation. The data acquisition system 5 is connected to the signal generator 1 and the power divider 2 via GPIB bus cables.

The data acquisition system 5, i.e., the Vector Network Analyser, was set to step in 501 frequency steps between 10 and 15 Ghz and the complex division of the received signal and the reference signal from the transmitter were stored for each frequency channel. A total integration time of 1 sec. was used for each data sampling.

The complex data was stored on computer discs and each spectrum was then analyzed off line with a special computer program. The computer program used is referred to internally as "SLAGG" and is illustrated in the form of the flow diagram shown in FIG. 5.

The actual computer program "SLAGG" is set forth immediately below. "SLAGG" and another computer program referred to internally as "MOLTOM5" make subroutine calls to four commercially available software packages. [The computer program "MOLTOM5" is more particularly utilized in conjunction with the invention disclosed in published International Application No. PCT/SE94/00100 (which corresponds to Swedish Patent Application No. 9300347-3).] These four commercially available software packages are:

PGPLOT from Dr. Tim Pearson, California Institute of Technology, Pasadena, Calif.;

LMSTR1 and GETERR from the Astronomical Image Processing System (AIPS) of National Radio Astronomy Observatory (NRAO), Socorro, N.M.; and SVDFIT from Numerical Recipes, Press, Flannery, Teukolsky and Vetterling, Cambridge University Press, isbn 0 521 30811 9.

Each of the four commercial software packages referred to immediately above is hereby expressly incorporated by reference herein.

The "SLAGG" computer program used in the above-described working example is as follows:

Docket No: NHL-SSA-13

```
      PROGRAM SLAGG
C
      INTEGER IS,PGBEGIN
      integer*2 status,dummy
      integer gfunc,ipvt(12)
      external gfunc
      character*128 fname1,fname2,fname3,record
      character*64 title
      character chcur*1
      double precision FR1(512),AMP1(512),PH1(512)
      double precision FR2(512),AMP2(512),PH2(512)
      double precision FR3(512),AMP3(512),PH3(512)
      double precision xcos,xsin
      real*4 FR4(1024),AMP4(1024),PH4(1024),xb(2),yb(2)
      real*4 FR5(1024),AMP5(1024),PH5(1024),ampfac
      real*8 data(1024),xfr(1024),enorm
      real*8 parms(12),fjac(12,12),work(2148),
     *       fvec(2048),tol,eparms(12),fnorm
      REAL*4 xmin,xmax,ymin,ymax,fmin(10),fmax(10)
      double precision freal,fimag,cfrq,bw,xcnt,
     *  tpi,x,u,udel,ampsum,freal2,fimag2,pihlf,pi
      double precision cos1(512),cos2(512),cos3(512),cos4(1003),
     *       sin1(512),sin2(512),sin3(512),sin4(1003)
C
      common /gdata/ data,xfr
      data fmin/10.0,11.0,12.0,13.0,14.0,10.0,13.0,10.0,12.0,10.0/
      data fmax/11.0,12.0,13.0,14.0,15.0,12.0,15.0,13.0,15.0,15.0/
      tpi=2.0d0*3.14159265350d0
      pi=3.1415926530d0
      pihlf=3.14159265350d0/2.0d0
      IN=0
      open(UNIT=7,file='slagg.par')
      read(7,'(A)') fname1
      read(7,'(A)') fname2
      read(7,*) xxmin,xxmax,xxoff,ampfac
      ier=pgbegin(0,'/msoft',1,1)
      OPEN(UNIT=17,FILE=fname1)
      OPEN(UNIT=18,FILE=fname2)
   1  read(17,*,end=10,err=1) x,y,z
1000  FORMAT(3F15.0)
      IN=IN+1
      FR1(IN)=X*1.0D-09
      If(y.lt.0.0) then
          amp1(in)=10.0e0**(0.1*y)
      else
          AMP1(IN)=Y
      endif
      PH1(IN)=Z*tpi/360.0d0
C     cos1(in)=amp1(in)*dcos(ph1(in))
```

Docket No: NHL-SSA-13

```
c       sin1(in)=amp1(in)*dsin(ph1(in))
        cos1(in)=dcos(ph1(in))
        sin1(in)=dsin(ph1(in))
        GOTO 1
   10 CONTINUE
        IN=0
    2   read(18,*,end=20,err=2) X,Y,Z
        IN=IN+1
        FR2(IN)=X*1.0D-09
        If(y.lt.0.0) then
           amp2(in)=10.0e0**(0.1*y)
        else
           AMP2(IN)=Y
        endif
        PH2(IN)=Z*tpi/360.0d0
c       cos2(in)=amp2(in)*dcos(ph2(in))
c       sin2(in)=amp2(in)*dsin(ph2(in))
        cos2(in)=dcos(ph2(in))
        sin2(in)=dsin(ph2(in))
        GOTO 2
   20 CONTINUE
        frsrt=fr1(1)
        frslp=fr1(501)
        cfrq=frsrt
c
        write(6,1111) frsrt,frslp,cfrq
        write(6,*) ' choose new values:y/n (default=n)'
        read(5,'(A)') chcur
        If(chcur.eq.'y'.or.chcur.eq.'Y') then
           write(6,*) ' enter values:'
           read(5,*) frsrt,frslp,cfrq
        endif
c
        bw=frslp-frsrt
        li1=len(fname1)
        jj1=1
        do ij1=1,il1
           if(fname1(ij1:ij1).eq.'\') jj1=ij1+1
           if(fname1(ij1:ij1).eq.' ') goto 11
        enddo
   11   li1=ij1-1
        il2=len(fname2)
        jj2=1
        do ij2=1,il2
           if(fname2(ij2:ij2).eq.'\') jj2=ij2+1
           if(fname2(ij2:ij2).eq.' ') goto 12
        enddo
   12   li2=ij2-1
        write(title,2222) fname1(jj1:li1),fname2(jj2:li2),frsrt,frslp
```

```
 2222   format(A,'-',A,1X,F5.1,'-',F5.1,'GHz')
c
c --------- setup freq.array
c
       do I=1,501
            FR3(I)=(FR1(I)-cfrq)*tpi
       enddo
c
c --------- u and udel are in nanosecs.
c
c      udel = 1.0d0/2.0d0/bw
       u = xxmin*2.0/0.3
       udel=(xxmax-xxmin)/512.0*2.0/0.3
c
c --------- do Fourier transform
c
c      do i=1,1003
       do i=1,512
          freal = 0.0d0
          fimag = 0.0d0
          freal2= 0.0d0
          fimag2= 0.0d0
          u = u + udel
c         xcnt=0.0d0
          amps1=0.0e0
          amps2=0.0e0
          do j=1,501
             if(FR1(j).ge.frsrt.and.FR1(j).le.frstp) then
c              xcnt=xcnt+1.0d0
               amps1=amps1+amp1(j)
               amps2=amps2+amp2(j)
               xcos=dcos(u*FR3(j))
               xsin=dsin(u*FR3(j))
c              xsin=-dsin(u*FR3(j))
               freal =freal +cos1(j)*xcos-sin1(j)*xsin
               fimag =fimag +cos1(j)*xsin+sin1(j)*xcos
               freal2=freal2+cos2(j)*xcos-sin2(j)*xsin
               fimag2=fimag2+cos2(j)*xsin+sin2(j)*xcos
             endif
          enddo
c         amp4(i)=(freal*freal+fimag*fimag)/amps1/amps1
          amp4(i)=(freal*freal+fimag*fimag)
c         ph4(i)=datan2(freal,fimag)/tpi*360.0d0
c         fr4(i)=(u*0.3)/2.0-xxoff
c         amp5(i)=amp4(i)-(freal2*freal2+fimag2*fimag2)/
c                 amps2/amps2*ampfac
          amp5(i)=amp4(i)-(freal2*freal2+fimag2*fimag2)*ampfac
c         ph5(i)=datan2(freal2,fimag2)/tpi*360.0d0
          fr5(i)=(u*0.3/2.0-xxoff)*100.0e0
```

Docket No: NHL-SSA-13

```
          enddo
          xmin=999999999.99
          xmax=-xmin
          ymin=xmin
          ymax=-ymin
          ymin2=xmin
          ymax2=-ymin
          xxmin=(xxmin-xxoff)*100.0
           xxmax=(xxmax-xxoff)*100.0
   c      do l=1,1002
          do l=1,512
            if(fr5(l).lt.xxmin) goto 21
            if(fr5(l).gt.xxmax) goto 21
            if(xmin.gt.fr5(l)) xmin=fr5(l)
            if(xmax.lt.fr5(l)) xmax=fr5(l)
            if(ymin.gt.amp4(l)) ymin=amp4(l)
            if(ymax.lt.amp4(l)) ymax=amp4(l)
            if(ymin2.gt.amp5(l)) ymin2=amp5(l)
            if(ymax2.lt.amp5(l)) ymax2=amp5(l)
   21     continue
          enddo
   400    call pgsci(4)
   c      write(6,*) xmin,xmax,xxmin,xxmax,xxoff,fr5(1),fr5(501)
   c      read(5,*) xmin,ymin
   c      xmin=fr5(1)
   c      xmax=fr5(501)
          CALL PGENV(XMIN,XMAX,YMIN2,YMAX2,0,0)
          call pgsci(1)
          CALL PGLABEL('offset from floor (cm)','power spectrum',title)
          call pgsci(7)
   c      CALL PGLINE(1002,FR5,AMP5)
          CALL PGLINE(512,FR5,AMP5)
          dya=(ymax2-ymin2)/20.0
          ya=ymax2-2.0*dya
   500.   continue
          read(7,*) xslr,xslp
          if(xslp.le.xslr) goto 900
          open(unit=19,file='slagg.res',access='append')
          write(19,1113)
   1113   format('***********************************',
         . '***********************')
          write(19,*) 'data_file=',fname1(1:ii1)
           write(19,*) ' ref_file=',fname2(1:ii2)
          write(19,1112)
   1112   format('-----------------------------------',
         . '-----------------------')
          write(19,1111) frsrt,frslp,clrq
   1111   format(' f_start=',f5.2,'   f_end=',f5.2,'   f_ref=',f5.2)
          write(19,1112)
```

```
          goto 502
   501    continue
          read(7,*) xstr,xstp
          if(xstp.le.xstr) goto 900
   502    continue
          jj=0
c         do l=1,1002
          do l=1,512
            if(fr5(i).ge.xstr.and.fr5(i).le.xstp) then
              jj=jj+1
              data(jj)=amp5(i)
              xfr(jj)=fr5(i)
            endif
          enddo
          read(7,*) parms(1),parms(2),parms(3)
          tol=1.0d-5
          call lmstr1(gfunc,jj,3,parms,fvec,fjac,12,tol,info,
     .         ipvt,work,2108)
          inpnts=jj
          fnorm=enorm(inpnts,fvec)
          call geterr(1,ipvt,fjac,eparms,3,jj,12,fnorm,work,tol)
          xb(1)=parms(2)
          xb(2)=parms(2)
          parms(2)=parms(2)
          parms(3)=parms(3)
          eparms(1)=eparms(1)*3.0d0
          eparms(2)=eparms(2)*3.0d0
          eparms(3)=eparms(3)*3.0d0
          write(19,1110) parms(1),eparms(1),parms(2),eparms(2),
     .         parms(3),eparms(3)
  1110    format(' gmax= ',f8.2,'+/-',f8.2,'  gpos= ',f6.1,'+/-',
     .        f4.1,' cm',' gwid= ',f4.1,'+/-',f4.1,' cm')
          xa=0.75*xmax
          ya=ya-dya
          write(title,2111) parms(2),eparms(2)
  2111    format(f6.1,'+/-',f4.1,' cm')
          call pgsci(2)
          call pgptext(xa,ya,0.0,0.0,title(1:16))
          yb(1)=ymin2
          yb(2)=ymax2
          call pgsci(2)
          call pgline(2,xb,yb)
          goto 501
   900    continue
          read(5,*)
          write(6,*) ' new gaussfit? (y/n):'
          read(5,'(A)') chcur
          if(chcur.ne.'y'.and.chcur.ne.'Y') goto 903
   901    write(6,*) ' lower limit'
```

```
              call pgcurs(xcur,ycur,chcur)
              if(chcur.eq.'q') goto 902
                write(6,*) ' upper limit'
              call pgcurs(zcur,ycur,chcur)
              if(chcur.eq.'q') goto 902
                write(7,*) xcur,zcur
                write(6,*) ' maxpoint'
              call pgcurs(xcur,ycur,chcur)
              if(chcur.eq.'q') goto 902
                write(7,*) ycur,xcur, ' 2.0'
              goto 901
       902    continue
              write(7,*) '-9 -99'
       903    CALL PGEND
C
              STOP
              END
              SUBROUTINE GFUNC (M, N, parms, FVEC, fjrow, IFLAG)
C                           Variables used as adjustable
C                           array dimension specifiers
C                           should be declared simply as
C                           INTEGER
              INTEGER M,N,LDFJAC,iflag
              REAL*8 parms(N),FVEC(M),fjrow(N),x
              real*8 data(1024),amp,pos,slg,xfr(1024),res2,tslg2,efact
              common /gdata/ data,xfr
C             ----------
C             If IFLAG = 1 calculate the functions at X and
C             return this vector in FVEC. Do not alter FJAC.
              if(iflag.gt.1) goto 100
              do idata=1,m
                amp=parms(1)
                pos=parms(2)
                slg=parms(3)
                res2=2.772d0*(xfr(idata)-pos)**2
                tslg2=slg**2
                fvec(idata)=data(idata)-amp*dexp(-1.d0*res2/tslg2)
              enddo
              goto 999
C             If IFLAG = 2 calculate the Jacobian at X and
C             return this matrix in FJAC. Do not alter FVEC.
       100    continue
              x=xfr(iflag-1)
              amp=parms(1)
              pos=parms(2)
              slg=parms(3)
              res2=2.772d0*(x-pos)**2
              tslg2=slg**2
              efact=dexp(-1.d0*res2/tslg2)
```

```
                fjrow(1)=-efact
                fjrow(2)=-5.544d0*amp*efact*(x-pos)/(sig*sig)
                fjrow(3)=-2.d0*amp*efact*res2/(sig**3)
  999     continue
C         ----------
        RETURN
        END
```

Figure 5:
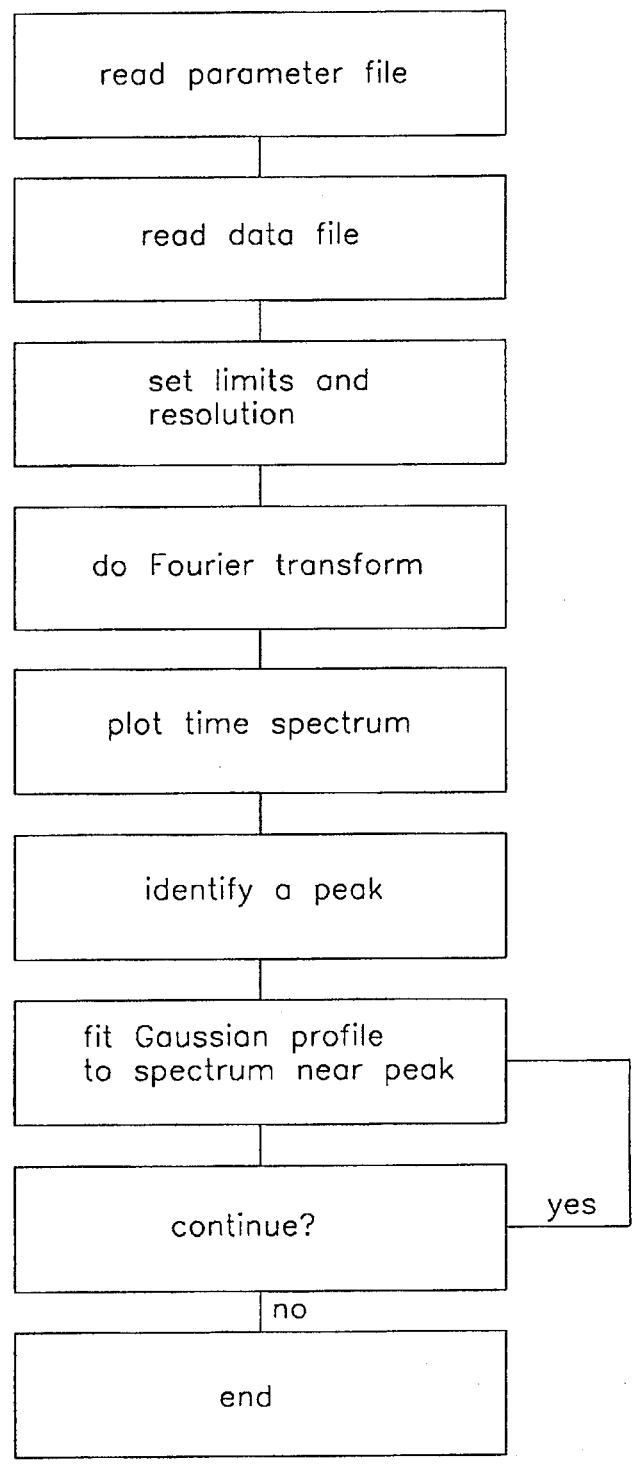
FIG. 5 is a flow diagram illustrating the sequence of steps performed by a computer program "SLAGG" set forth hereinbelow.

FIG. 5 illustrates in the form of a flow diagram the sequence of steps carried out by the above computer program "SLAGG".

The above-described working example was conducted employing microwave frequencies in the 10 to 14 GHz range. However, it is believed that other frequency ranges can be effectively employed.

The published PCT application to which the present U.S. application corresponds, namely PCT/SE94/00099, the published Swedish application from which it claims priority SE 9300348-1, as well as all documents cited in the International Search Report issued thereon, including U.S. Pat. No. 4,737,791 issued to Jean et al. on Apr. 28, 1988, U.S. Pat. No. 5,115,242 issued to Nagamune et al. on May 19, 1992, German Auslegeschrift 28 12 871 (and its U.S. counterpart, U.S. Pat. No. 4,210,023, issued on Jul. 1, 1980) and European Patent 0060597 (and its U.S. counterpart, U.S. Pat. No. 4,458,530, issued on Jul. 10, 1984), are hereby expressly incorporated by reference as if set forth in their entirety herein. Additionally, published PCT application PCT/SE94/00099 is directed to similar subject matter disclosed in published PCT application PCT/SE94/00100, which PCT application, the published Swedish application from which it claims Priority, SE 9300347-3, together with all documents cited in the International Search Report issued thereon, namely U.S. Pat. No. 5,124,653 issued to Andresen et al., U.S. Pat. No. 4,693,614 issued to Hatono et al., U.S. Pat. No. 4,438,069 issued to Peterman et al. and U.K. Patent No. 2 030 414 (and its U.S. counterpart, U.S. Pat. No. 4,275,787, issued on Jun. 30, 1981), are also hereby expressly incorporated by reference into the present application.

Examples of phase (and phase difference detectors operating in the microwave frequency range are disclosed in U.S. Pat. No. 5,266,954 entitled "Microwave Vehicle Detector", issued on Nov. 30, 1993 to Orlowski et al., and U.S. Pat. No. 5,180,985 entitled "Multipactor Effect Measurement Device Using Phase Noise", issued on Jan. 19, 1993 to Zoccarato et al., both of these issued hereby expressly incorporated by reference herein.

One feature of the invention resides broadly in the method for simultaneously measuring the positions of more than one surfaces in metallurgic processes, characterized in that it comprises transmitting a radio signal over a frequency band, receiving the signals reflected from the surfaces, measuring the phase difference between the transmitted and reflected signals over the frequency band and making a transform from frequency domain to time domain resulting in the said positions.

Another feature of the invention resides broadly in the method characterized in that it comprises stepping a signal generator in discrete frequency steps over the frequency band and receiving the reflected signals for each frequency step, comparing the phase difference of the transmitted and reflected signals in each step over the frequency band and making a discrete transform from frequency domain to time domain resulting in the said positions.

Yet another feature of the invention resides broadly in the method characterized in that it comprises transmitting a radio signal in circular polarization from an antenna mounted so that the transmitted wave is aimed perpendicular to the surfaces and the reflected wave is received in the same antenna but in the opposite circular polarization.

Still another feature of the invention resides broadly in the method characterized in that the phases of the signals are compared by doing a complex conjugate multiplication in the frequency plane, i.e. a cross correlation in time domain, for each discrete frequency channel.

A further feature of the invention resides broadly in the method characterized in that the antenna is formed by an interferometer and the three dimensional structure of the surfaces are imaged by a three dimensional transform from frequency and aperture plane to time and image plane.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Swedish Patent Application No. 9300348-1, filed on Feb. 3, 1993, and PCT/SE94/00099, filed on Feb. 3, 1994, having inventor Lars Bååth, and SE-OS 9300348-1 and SE-PS 9300348-1 and International Application No. PCT/SE94/00099, and International Publication No. WO94/18549, as well as their published equivalents, and other equivalents or corresponding applications, if any, in corresponding cases in Sweden and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A method for measuring the position of at least one surface in a metallurgical process, said method comprising the steps of:

providing a metallurgical melt, said metallurgical melt comprising at least a metal portion and a slag layer;

said metal portion having at least one metal portion surface, and said slag layer having at least one slag layer surface;

providing signal generation means for generating signals at a plurality of frequencies over a frequency band;

providing antenna means for receiving said signals generated by said signal generation means and for transmitting circularly polarized radio waves at said plurality of frequencies over said frequency band;

disposing said antenna means adjacent said metallurgical melt;

transmitting said circularly polarized radio waves from said antenna means toward said metallurgical melt;

said circularly polarized radio waves being transmitted by said antenna means at said plurality of frequencies over said frequency band;

receiving reflected images of said transmitted radio waves through said antenna means;

said received reflected images of said transmitted radio waves having a substantially opposite circular polarization from said transmitted circularly polarized radio waves;

determining a phase displacement between said transmitted radio waves and said received reflected images of said transmitted radio waves;

transforming said determined phase displacement from the frequency domain to the time domain; and determining from said time domain transform a position of at least one of said at least one metal portion surface and said at least one slag layer surface.

2. A method for measuring the position of at least one surface in a metallurgical process according to claim 1:

wherein said step of determining a phase difference between said transmitted radio waves and said received reflected images of said transmitted radio waves comprises the step of cross correlating said transmitted radio waves and said received reflected images of said transmitted radio waves in the time domain.

3. A method for measuring the position of at least one surface in a metallurgical process according to claim 2:

wherein said antenna means comprises an interferometer.

4. A method for measuring the position of at least one surface in a metallurgical process according to claim 3:

wherein said step of transmitting said circularly polarized radio waves from said antenna means toward said metallurgical melt comprises the step of transmitting said circularly polarized radio waves at sequential frequencies of said plurality of frequencies.

5. A method for measuring the position of at least one surface in a metallurgical process according to claim 4:

wherein said metallurgical melt is contained within a metallurgical vessel;

wherein said metal portion comprises molten metal, said slag layer being disposed above said molten metal;

wherein said at least one metal portion surface comprises an upper surface of said molten metal;

wherein said at least one slag layer surface comprises an upper surface of said slag layer; and wherein said method further comprises the additional steps of:

providing a reference surface;

transmitting said circularly polarized radio waves from said antenna means toward said reference surface;

receiving at said antenna means reflected reference images of said transmitted radio waves, said reflected reference images being reflected by said reference surface; and comparing said radio waves reflected from said metallurgical melt and received at said antenna means to said reflected reference images reflected from said reference surface and received at said antenna means to thereby determine the positions of said upper surface of said molten metal and said upper surface of said slag layer.

6. A method for measuring the position of at least one surface in a metallurgical process according to claim 5:

wherein said reference surface is disposed on said metallurgical vessel.

7. A method for measuring the position of at least one surface in a metallurgical process according to claim 6:

wherein said step of transmitting said radio waves toward said metallurgical melt and said step of receiving said reflected images of said radio waves reflected by said metallurgical melt are carried out while said metallurgical melt is contained in a metallurgical vessel moving past said antenna means.

8. A method for measuring the position of at least one surface in a metallurgical process according to claim 7:

wherein said method additionally comprises the further step of guiding said interferometer along at least one of a line and a surface.

9. A method for measuring the position of at least one surface in a metallurgical process, said method comprising the steps of:

providing a metallurgical melt, said metallurgical melt comprising at least a metal portion and a slag layer;

said metallurgical melt having an interface surface disposed between said metal portion and said slag layer and an upper surface of said slag layer;

providing transmitter means for transmitting circularly polarized radio waves;

disposing said transmitter means adjacent said metallurgical melt;

transmitting said circularly polarized radio waves from said transmitter means toward said metallurgical melt;

providing receiver means for receiving reflected images of said radio waves transmitted by said transmitter means toward said metallurgical melt and reflected by said metallurgical melt;

receiving said reflected images of said transmitted radio waves at said receiver means;

said received reflected images of said transmitted radio waves having a substantially opposite circular polarization from said transmitted circularly polarized radio waves;

determining a phase displacement between said transmitted radio waves and said received reflected images of said transmitted radio waves;

transforming said determined phase displacement from a frequency domain to a time domain; and determining from said time domain transform a position of at least one of said interface surface disposed between said metal portion and said slag layer and said upper surface of said slag layer.

10. A method for measuring the position of at least one surface in a metallurgical process according to claim 9:

wherein said step of transmitting said radio waves from said transmitter means toward said metallurgical melt comprises the step of transmitting said radio waves at a plurality of frequencies;

wherein said step of receiving said reflected images of said transmitted radio waves comprises the step of receiving said reflected images of said transmitted radio waves at each of said plurality of frequencies; and wherein said step of determining a phase displacement between said transmitted radio waves and said received radio waves comprises the step of determining said phase displacement at each of said plurality of frequencies.

11. A method for measuring the position of at least one surface in a metallurgical process according to claim 10:

wherein said step of determining a phase displacement between said transmitted radio waves and said received reflected images of said transmitted radio waves at each of said plurality of frequencies comprises the step of cross correlation in the time domain of said transmitted radio waves and said received reflected images of said transmitted radio waves.

12. A method for measuring the position of at least one surface in a metallurgical process according to claim 11:

wherein said step of cross correlation in the time domain comprises the step of complex conjugate multiplication of said transmitted radio waves and said received reflected images of said transmitted radio waves.

13. A method for measuring the position of at least one surface in a metallurgical process according to claim 12:

wherein said transmitter means and said receiver means each comprise a common antenna.

14. A method for measuring the position of at least one surface in a metallurgical process according to claim 13, said method comprising the additional steps of:

providing a reference surface for reflecting said transmitted radio waves;

transmitting said radio waves from said antenna toward said reference surface;

receiving at said receiver means reflected reference images of said transmitted radio waves, said reflected reference images being reflected by said reference surface;

constructing a Point Spread Function from said reflected reference images reflected by said reference surface; and deconvolving said received reflected images of said transmitted radio waves reflected from said metallurgical melt with said constructed Point Spread Function to thereby determine said position of said at least one of said interface surface disposed between said metal portion and said slag layer and said upper surface of said slag layer relative to said reference surface.

15. A method for measuring the position of at least one surface in a metallurgical process according to claim 14:

wherein said step of determining said position of said at least one of said interface surface disposed between said metal portion and said slag layer and said upper surface of said slag layer relative to said reference surface comprises the step of determining the positions of each of said interface surface disposed between said metal portion and said slag layer and said upper surface of said slag layer relative to said reference surface.

16. A method for measuring the position of at least one surface in a metallurgical process according to claim 15, wherein said method comprises the additional steps of:

containing said metallurgical melt in a metallurgical vessel during said step of transmitting said radio waves toward said metallurgical melt and during said step of receiving said reflected images of said transmitted radio waves reflected by said metallurgical melt; and wherein said reference surface comprises a surface disposed on said metallurgical vessel.

17. A method for measuring the position of at least one surface in a metallurgical process according to claim 16:

wherein said step of transmitting said radio waves at a plurality of frequencies comprises the step of transmitting said radio waves over a band of frequencies; and wherein said step of receiving said reflected images of said transmitted radio waves comprises the step of receiving said reflected images of said transmitted radio waves over said band of frequencies.

18. A method for measuring the position of at least one surface in a metallurgical process according to claim 17:

wherein said step of transmitting said radio waves over said band of frequencies comprises the step of sequentially transmitting said radio waves at a plurality of discrete frequencies over said band of frequencies.

19. A method for measuring the position of at least one surface in a metallurgical process according to claim 18:

wherein said step of transmitting said radio waves and said step of receiving said reflected images of said transmitted radio waves are carried out while said metallurgical melt contained in said metallurgical vessel moves past said common antenna.

20. A method for measuring the position of at least one surface in a metallurgical process according to claim 19;

wherein said common antenna comprises an interferometer.

* * * * *

UNITED STATES PATENT AND TRADEMARK OFFICE
CERTIFICATE OF CORRECTION

PATENT NO. : 5,629,706
DATED : May 13, 1997
INVENTOR(S) : Lars BÅÅTH

It is certified that error appears in the above-identified patent and that said Letters Patent is hereby corrected as shown below:

On the title page, item [63], under the "Related U.S. Application Data" section, after 'PCT/SE94/00099', delete "Feb. 13," and insert --Feb. 3,--.

In column 1, line 44, after 'ceramic', delete "material." and insert --material, e.g., slag.--

In column 1, line 49, after 'that', delete "this" and insert --the--.

In column 2, line 29, after 'distance', delete "car/thus" and insert --can thus--.

In column 2, line 31, after 'then', delete "pan" and insert --part--.

In column 4, after line 45, in the table, delete lines 47-49, beginning with "An actual" and ending with "utilized:".

UNITED STATES PATENT AND TRADEMARK OFFICE
CERTIFICATE OF CORRECTION

PATENT NO. : 5,629,706            Page 2 of 3
DATED     : May 13, 1997
INVENTOR(S) : Lars BARTH It is certified that error appears in the above-identified patent and that said Letters Patent is hereby corrected as shown below:

In columns 7-8, the last line, delete "NHL:ras/ksm/tlb     4    SSA-13 04/SSA014".

In column 8, line 1, delete "Docket No.: NHL-SSA-13".

In columns 9-10, the last line, delete "NHL:ras/ksm/tlb     5    SSA-13 04/SSA014".

In column 10, line 1, delete "Docket No.: NHL-SSA-13".

In columns 11-12, the last line, delete "NHL:ras/ksm/tlb     6    SSA-13 04/SSA014".

In column 12, line 1, delete "Docket No.: NHL-SSA-13".

In columns 13-14, the last line, delete "NHL:ras/ksm/tlb     7    SSA-13 04/SSA014".

In column 14, line 1, delete "Docket No.: NHL-SSA-13".

In columns 15-16, the last line, delete "NHL:ras/ksm/tlb     8    SSA-13 04/SSA014".

UNITED STATES PATENT AND TRADEMARK OFFICE
CERTIFICATE OF CORRECTION

PATENT NO. : 5,629,706
DATED : May 13, 1997
INVENTOR(S) : Lars BÅÅTH

Page 3 of 3

It is certified that error appears in the above-identified patent and that said Letters Patent is hereby corrected as shown below:

In column 16, line 1, delete "Docket No.: NHL-SSA-13".

In columns 17-18, the last line, delete "NHL:ras/ksm/tlb    9    SSA-13 04/SSA014".

In column 18, line 1, delete "Docket No.: NHL-SSA-13".

In columns 19-20, the last line, delete "NHL:ras/ksm/tlb    10    SSA-13 04/SSA014".

In column 20, line 1, delete "Docket No.: NHL-SSA-13".

In column 3, line 56, in the equation, after the second occurrence of "slag", delete "7c" and insert --/c--.

Signed and Sealed this

Fourth Day of November, 1997

BRUCE LEHMAN

*Attest:*

*Attesting Officer*    *Commissioner of Patents and Trademarks*